United States Patent [19]
Scott

[11] Patent Number: 5,951,456
[45] Date of Patent: Sep. 14, 1999

[54] ULTRASONIC METHODS AND APPARATUS FOR SEPARATING MATERIALS IN A FLUID MIXTURE

[76] Inventor: Harold W. Scott, 1528-B Orange Ave., Costa Mesa, Calif. 92627

[21] Appl. No.: 08/857,370

[22] Filed: May 16, 1997

[51] Int. Cl.⁶ .......................... B01D 17/04; B01D 21/28; B03C 1/00
[52] U.S. Cl. ................. 516/195; 204/157.42; 204/158.2; 204/193; 210/708; 210/748; 516/197
[58] Field of Search ............................. 252/349; 210/748, 210/796, 708; 204/573, 661, 666, 193, 157.42; 516/195, 197

[56] References Cited

U.S. PATENT DOCUMENTS

| | | | |
|---|---|---|---|
| 2,075,300 | 3/1937 | Pflanz | 210/796 |
| 2,257,997 | 10/1941 | Barnes | 252/349 X |
| 2,864,502 | 12/1958 | May | 252/349 X |
| 2,896,922 | 7/1959 | Pohlman | 210/748 X |
| 3,594,314 | 7/1971 | Bilhartz et al. | 210/748 X |
| 4,055,491 | 10/1977 | Porath-Furedi | 210/748 X |
| 4,280,823 | 7/1981 | Szonntagh | 210/748 |
| 4,556,467 | 12/1985 | Kuhn et al. | 210/748 X |
| 5,164,094 | 11/1992 | Stuckart | 210/748 X |

OTHER PUBLICATIONS

The Condensed Chemical Dictionary, Sixth Edition, Reinhold Publ. Corp., New York (1961) p. 217.

Primary Examiner—Richard D. Lovering
Attorney, Agent, or Firm—Richard E. Bee

[57] ABSTRACT

An efficient method of separating a first material from a second material in a fluid mixture is provided. The fluid mixture of interest is caused to flow through two different sonic wave fields. In one field, the sonic waves travel in a direction perpendicular to the direction of flow of the fluid mixture. In the other field, the sonic waves travel in a direction parallel to the direction of flow of the fluid mixture. The overall effect of the sonic waves in these two fields is to irreversibly break any molecular bonding between a substantial portion of a first material and a second material in the fluid mixture. In one embodiment, the perpendicular-directed sonic waves are cavitation waves and the parallel-directed sonic waves are standing waves.

25 Claims, 4 Drawing Sheets

ULTRASONIC METHODS AND APPARATUS FOR SEPARATING MATERIALS IN A FLUID MIXTURE

TECHNICAL FIELD

This invention relates to sonic and ultrasonic methods and apparatus for separating a first material from a second material in a fluid mixture. It is particularly useful for separating hydrocarbons, organics, suspended solids and inorganic materials from a fluid solution.

The term "sonic" is used in this description and in the appended claims in a generic sense and is intended to include all sonic, ultrasonic, supersonic and hypersonic type vibrations and pressure waves.

BACKGROUND OF THE INVENTION

The separation of hydrocarbons, organic materials, suspended solids and inorganic materials from a fluid solution has been practiced for many generations. Many of these practices include, but are not limited to:

applied heat or pressure or both;
addition of chemicals to oxidize, reduce and neutralize electrical unbalance;
addition of emulsion breakers;
use of centrifugal forces;
flocculating;
filtrating;
and similar processes.

These previously used or proposed processes suffer from one or more of the following disadvantages:

heat driven chemical reactions;
relatively long processing times;
complicated and costly equipment;
high energy consumption;
complicated operating procedures;
limited versatility;
require extensive maintenance;
short useful lifetimes; or
high cost per volume processed.

In general, it would be desirable to have separation methods and apparatus which can easily and efficiently separate different materials with a minimum of processing time. It would also be desirable to provide a method which is economical in operation and requires a minimum amount of fixed equipment.

SUMMARY OF THE INVENTION

The present invention provides a relatively easy and uncomplicated, yet very efficient method of separating a first material from a second material in a fluid mixture. In particular, the fluid mixture of interest is caused to flow through two different sonic wave fields. In one field, the sonic waves travel in a direction perpendicular to the direction of flow of the fluid mixture. In the other field, the sonic waves travel in a direction parallel to the direction of flow of the fluid mixture. The overall effect of the sonic waves in these two fields is to break any molecular bonding between a substantial portion of a first material and a second material in the fluid mixture.

In one embodiment, the perpendicular-directed sonic waves are cavitation waves and the parallel-directed sonic waves are standing waves. The cavitation waves provide a homogenizing action whereby the material particles are broken up and more or less uniformly dispersed. The standing waves, on the other hand, cause an agglomeration or gathering together of like particles at the nodes and antinodes of the of the standing waves.

These wave actions serve to break or sever any molecular bonding between the different materials. And this process is irreversible. The treated components do not recombine and may be physically separated by known weight-sensitive separation techniques. For example, the treated mixture may be supplied to an appropriate settling tank and allowed to settle. In this case, the particles of the heavier material will fall to the bottom of the tank, while the particles of the lighter material will rise to the top.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DETAILED DESCRIPTION OF THE ILLUSTRATED EMBODIMENT

Figure 1:
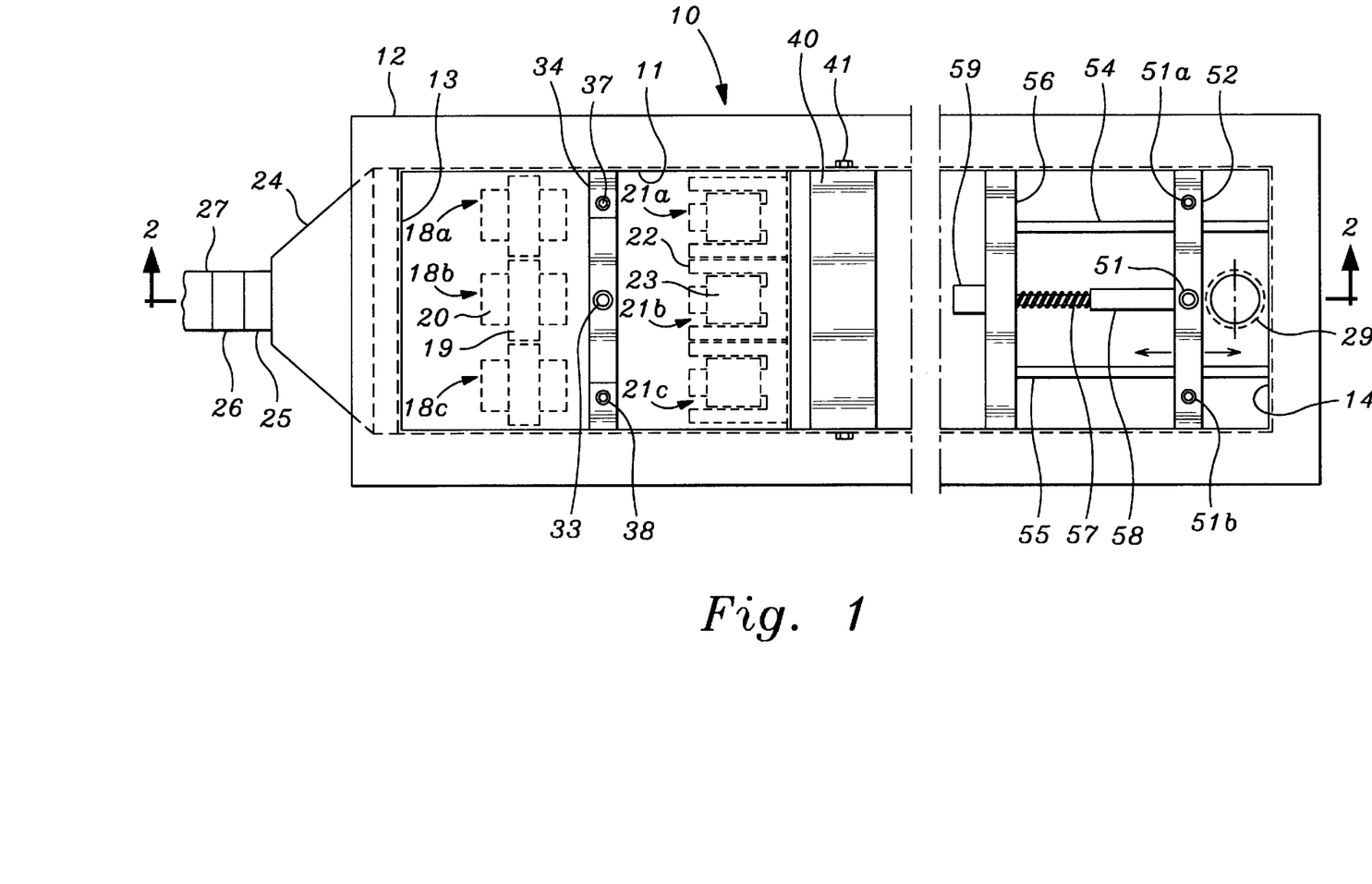
FIG. 1 is a plan view of a representative embodiment of sonic separator apparatus constructed in accordance with the present invention.
Figure 2:
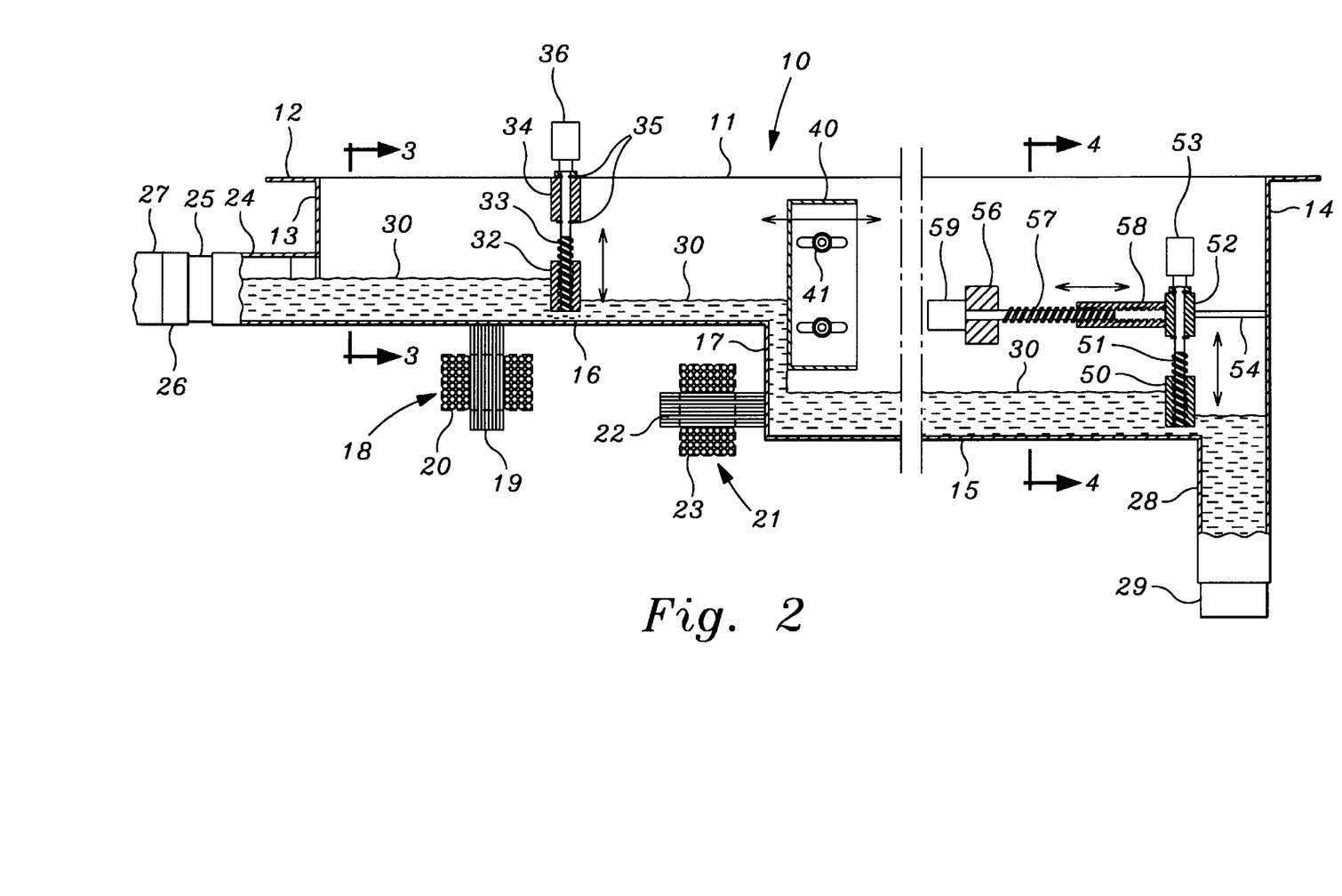
FIG. 2 is an elevational cross-section of the FIG. 1 apparatus taken along Section Line 2—2 of FIG 1.

Referring to FIGS. 1 and 2, there is shown sonic separator apparatus 10 for use in separating a first material from a second material in a fluid mixture. This sonic separator apparatus includes a generally-rectangular trough-like channel structure 11 which provides a flow channel for the fluid mixture. Channel structure 11 has an inlet end wall 13 and an outlet end wall 14. As seen in FIG. 2, the bottom of the channel structure 11 has a step construction with the outlet end portion 15 being at a lower elevation than the inlet end portion 16. The bottom portion 15 is connected to the bottom portion 16 by a vertical riser portion 17. The front and back sides of the channel structure 11 are solid metal walls and the top of the channel structure 11 is open. A metal flange 12 runs completely around the top edge of the channel structure 11 and, as seen in FIG. 2, extends outward from the channel structure 11. Flange 12 may be used for mounting and supporting the channel structure 11.

The bottom and side walls of channel structure 11 are made of stainless steel having, for example, a 10-gage thickness. Thus, the channel structure 11 is rigid in nature and typically will have a length of some four to five feet.

A wedge-shaped stainless steel header box 24 is welded to the inlet end wall 13 with the wider opening in the header box being aligned with a corresponding opening in the lower portion of end wall 13, such opening extending laterally across the width of the end wall 13. The narrow end of header box 24 is provided with a circular pipe portion 25 which is adapted for coupling to a fluid supply pipe 27. A sound velocity sensor 26 is connected between header pipe portion 25 and the fluid supply pipe 27 for measuring the velocity of sound waves in the fluid mixture entering through supply pipe 27.

Figure 4:
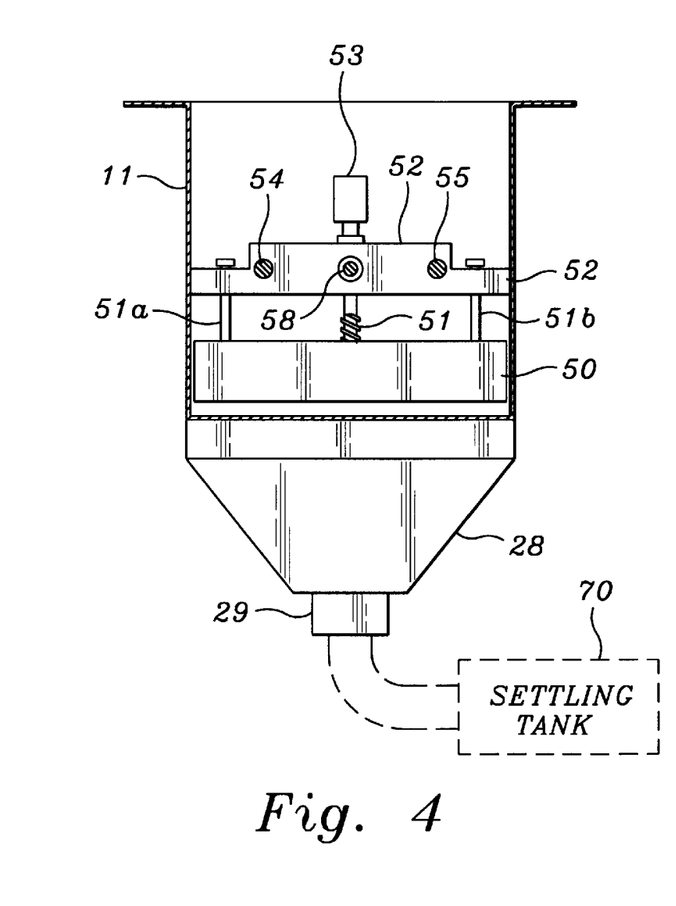
FIG. 4 is a transverse cross-sectional view of the FIG. 1 apparatus taken along Section Line 4—4 of FIG. 2.

A second wedge-shaped stainless steel header box 28 is connected to the channel structure bottom portion 15 in a downward extending manner at the outlet end wall 14. The shape of this outlet header box 28 is best seen in FIG. 4. The opening in the wider upper end of header box 28 is aligned with a corresponding opening in the bottom portion 15 of the channel structure 11. The lower end of outlet header box 28 is provided with a circular pipe portion 29 which is adapted to be coupled to an appropriate discharge pipe (not shown).

The fluid mixture flowing through channel structure 11 is indicated by reference number 30 in FIG. 2. This fluid mixture is supplied to the inlet header box 24 by the supply pipe 27. It enters the channel structure 11 by way of the inlet header box 24 and flows along the channel structure bottom portion 16, downward along the riser portion 17, across the channel structure bottom portion 15 and into the outlet header box 28. The fluid mixture 30 leaves the channel structure 11 by way of outlet header box 28 and whatever discharge pipe is connected to header outlet pipe 29.

Figure 3:
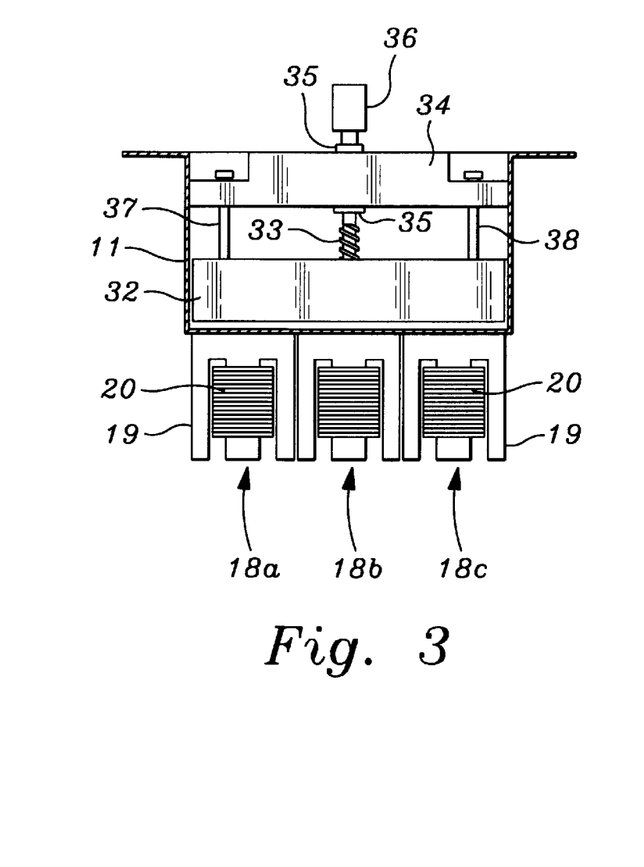
FIG. 3 is a transverse cross-sectional view of the FIG. 1 apparatus taken along Section Line 3—3 of FIG. 2.

The sonic separator apparatus 10 further includes a first sonic transducer mechanism 18 coupled to the channel structure bottom portion 16 for producing in the fluid mixture 30 first sonic waves which travel in a direction perpendicular to the direction of flow of the fluid mixture. In the illustrated case, the sonic vibrations emitted by transducer mechanism 18 travel in a vertical direction toward the upper surface of the fluid mixture 30. As best seen in FIG. 3, the transducer mechanism 18 of the present embodiment is comprised of three individual transducers 18a, 18b and 18c which are mounted in a side-by-side manner across the width of the channel structure 11. The upper surfaces of these transducers 18a, 18b and 18c are silver soldered to the underside of the channel structure bottom portion 16. Each individual transducer, for example, the transducer 18a, is comprised of a laminated E-shaped core piece 19 having a coil 20 of insulated electrical wire wrapped around the middle leg of the core piece 19. Energizing the coil 20 with electrical alternating current causes the core piece 19 to vibrate back-and-forth in a vertical direction.

The sonic separator apparatus 10 also includes a second sonic transducer mechanism 21 which is coupled to the underside of the channel structure 11 for producing in the fluid mixture 30 additional sonic waves which travel in a direction parallel to the direction of flow of the fluid mixture 30. In the present embodiment, this second transducer mechanism 21 is attached to the vertical riser portion 17 (FIG. 2) which connects the two horizontal bottom portions 15 and 16 of the channel structure 11. The transducer mechanism 21 is oriented to emit sonic vibrations in a horizontal direction toward the outlet end wall 14. As seen in FIG. 1, the transducer mechanism 21 is comprised of three individual transducers 21a, 21b and 21c which are mounted in a side-by-side manner across the width of the channel structure 11. Each of the transducers 21a, 21b and 21c has a laminated E-shaped core piece 22 and an electrical coil 23 which is wrapped around the middle leg of the core piece 22. The core pieces 22 are silver soldered to the riser portion 17.

In the majority of applications, the sonic transducer mechanisms will be of the magnetostrictive type, as shown. For those applications where less sonic power needs to be applied to the fluid mixture being treated, piezoelectric type transducers may be used.

The sonic separator apparatus 10 also includes a first transverse weir member 32 located in the inlet end portion of the channel structure 11 downstream of the first sonic transducer mechanism 18. Weir member 32 functions as a dam structure for controlling the flow of the fluid mixture 30. The vertical position of weir member 32 is adjustable for adjusting the depth of the fluid mixture seen by the first sonic transducer mechanism 18.

The construction of the elements associated with weir member 32 are best seen in FIG. 3. As there seen, weir member 32 is suspended from an overhead support beam 34 which is rigidly attached to the side walls of the channel structure 11. More particularly, the weir member 32 is supported by a drive shaft 33 having a threaded (worm gear) lower portion which engages a mating threaded passageway in the weir member 32 (see FIG. 2). Drive shaft 33 extends upwardly through a passageway in the support beam 34 and is retained therein by upper and lower retaining clips 35. Drive shaft 33 is free to rotate in the support beam passageway. An electric motor 36 is connected to the upper end of drive shaft 33 and, when energized, serves to rotate the drive shaft 33. Depending on the direction of rotation, this rotation causes a raising or lowering of the weir member 32. Vertically-extending guide shafts 37 and 38 (FIG. 3) help stabilize the movement of the weir member 32, these guide shafts 37 and 38 being slidably located in appropriate passageways extending through the support beam 34.

An adjustable fluid flow guide member 40 is located a short distance away from the vertical riser portion 17, on the downstream side thereof The location of the guide member 40 along the longitudinal center line of the channel structure 11 may be adjusted by loosening the mounting nuts 41 and sliding the guide member 40 to the right or left, as may be needed. The purpose of the guide member 40 is to cause the fluid mixture 30 to flow downward along the inner wall of the riser portion 17, with the fluid mixture 30 in contact with such inner wall. This provides good sonic coupling of the transducer 21 vibrations into the fluid mixture 30 located downstream of the riser portion 17.

The sonic separator apparatus 10 further includes a second transverse weir member 50 (see FIGS. 2 and 4) which is located in the outlet end portion of the channel structure 11 downstream of the second sonic transducer mechanism 21. The vertical position of this second weir member 50 is adjustable for adjusting the depth of the fluid mixture 30 seen by the second sonic transducer mechanism 21. The structure for providing this vertical position adjustment is generally, but not entirely, similiar to the corresponding structure for the first weir member 32. In particular, the second weir member 50 is suspended from a moveable support beam 52 by means of a threaded drive shaft 51. An electric motor 53, when energized, causes rotation of the drive shaft 51 to cause a raising or lowering of weir member 50, depending on the direction of rotation of motor 53. Vertical guide shafts 51a and 51b help maintain the proper orientation for the weir member 50 as it is raised or lowered.

A mechanism is also provided for adjusting the longitudinal position of the second weir member 50 so as to change the distance between it and the second transducer mechanism 21. This adjustment is significant because the weir member 50 is also used as a reflector for the horizontally-traveling sonic waves emitted by the transducer mechanism 21. This longitudinal position adjustment is provided by a threaded drive shaft 57 having one end longitudinally fixed in a transverse support beam 56 which is firmly attached to the sidewalls of the channel structure 11 and having the other end extending into a threaded passageway in a tubular sleeve member 58 which is securely attached to the moveable transverse support beam 52 The support beam 52 for the weir member 50 is slidably supported by a pair of horizontal guide shafts 54 and 55 which are securely attached at one end to the fixed support beam 56 and are securely attached at the other end to the outlet end wall 14 (see FIG. 1). An electric motor 59 is mounted on the fixed support beam 56 and is coupled to the horizontal drive shaft 57 so that when the motor 59 is energized, it rotates the drive shaft 57 which, in turn, causes the slidable support beam 52 to slide along the guide shafts 54 and 55, either in the direction of the transducer mechanism 21 or in the direction of the outlet end wall 14, depending on the direction of rotation of the drive shaft 57.

Figure 5:
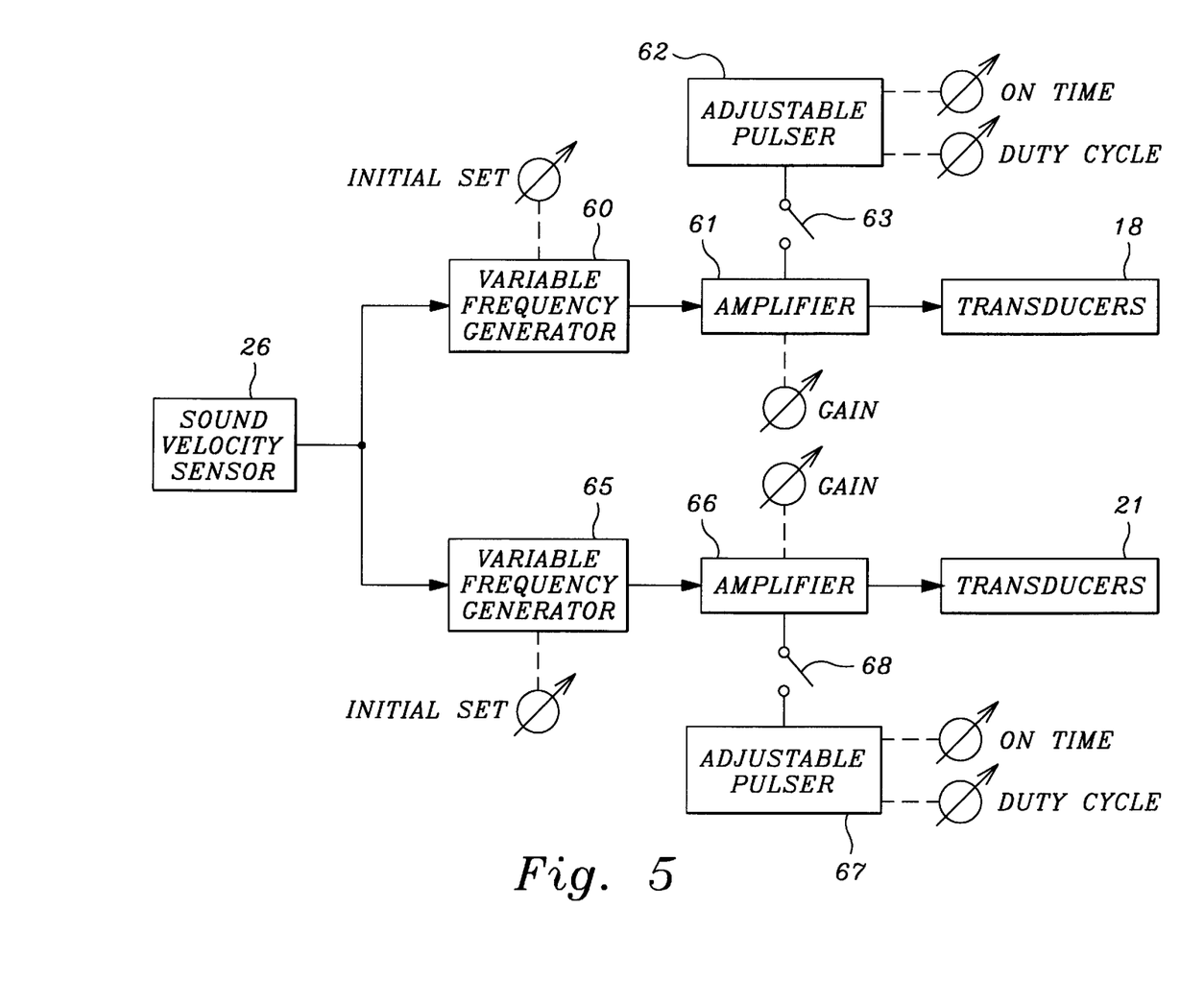
FIG. 5 is an electrical block diagram of representative electrical circuits that may be used in connection with the sonic separator apparatus of FIGS. 1–4.

Referring to FIG. 5 of the drawings, there is shown a block diagram of representative electrical circuits that may be used with the sonic separator apparatus 10 of FIGS. 1–4. For sake of cross-reference, the sound velocity sensor 26 of FIG. 5 corresponds to the like-numbered element shown in FIGS. 1 and 2 and connected between the inlet pipe portions 25 and 27. Sound velocity sensor 26 senses the velocity of sound waves in the fluid mixture 30 as it enters the channel structure 11. Sensor 26 produces an output signal which is indicative of such sound wave velocity. Sensor 26 may be, for example, a known type of sonic sensor for measuring the travel time of a sonic pulse over a known distance in the fluid mixture 30.

Transducers 18 and 21 of FIG. 5 represent the like-numbered sonic transducer mechanisms shown in FIGS. 1–3.

The electrical circuits shown in FIG. 5 further include a first variable frequency electrical wave generator 60 for energizing the sonic transducers 18. The electrical wave produced by generator 60 is supplied to transducers 18 by way of amplifier circuit 61. The power level of the wave supplied to transducers 18 can be adjusted by adjusting the gain of amplifier 61. The initial frequency for the electrical sine wave signal produced by generator 60 should be somewhere in the range of 15,000 Hertz (cycles per second) to 40,000 Hertz. A good choice for this initial operating frequency is 20,000 Hertz, which is slightly above the normal human hearing range. The generator 60 should be capable of varying its operating frequency by plus or minus 100 Hertz or more in response to signals from the sound velocity sensor 26.

Generator 60 is responsive to the output signal produced by the sound velocity sensor 26 for adjusting the frequency of the generated electrical wave for minimizing any change in wavelength in the fluid mixture 30 of the sonic waves produced by transducers 18. As will be explained, the wavelength of the sonic waves in the fluid mixture is of considerable importance for obtaining optimum performance of the sonic separator apparatus 10. For any given set of physical parameters, there is an optimum wavelength and this wavelength should remain constant. This wavelength is dependent on the density of the fluid mixture 30.

Unfortunately, there can be occasional changes in the density of the fluid mixture 30 and these changes will cause corresponding changes in the wavelength of the sonic waves. These changes can be neutralized, however, if the frequency produced by the generator 60 is changed in a corresponding manner. If, for example, the density increases and nothing else is done, the wavelength of the sonic waves will increase. If, however, the frequency produced by generator 60 is increased by a corresponding amount, this will reduce the wavelength in an offsetting manner. If perfectly matched, this will cause the wavelength to remain constant.

The velocity sensed by sensor 26 is proportional to the density of the fluid mixture 30. Thus, this velocity signal can be used to control the frequency of generator 60 so as to hold the wavelength of the sonic waves in the fluid mixture substantially constant. And this is what is done by the circuit embodiment shown in FIG. 5.

As indicated in FIG. 5, an adjustable pulser circuit 62 is connected by way of a switch 63 to a control terminal of the amplifier 61. When switch 61 is open, pulser 62 has no effect on the operation of transducers 18. In this case, the sonic waves from transducers 18 are produced in a continuous manner. In some cases, however, it will be desirable to have the transducers emit the sonic waves in a pulsed manner. This is accomplished by repetitively turning the sonic waves on and off. In the FIG. 5 embodiment, this is accomplished by closing the switch 63. Pulser 62 produces a rectangular "on-off" type of output signal. When switch 63 is closed, this "on-off" type signal is supplied to a control terminal of amplifier 61. When the pulser signal is "on", it disables the amplifier 61 so that electrical wave signals produced by generator 60 are not passed on to the transducers 18. Conversely, when the signal from pulser 62 is "off", the amplifier 61 operates in its normal manner to pass the electrical waves from generator 60 on to the transducers 18 to energize such transducers to cause them to emit the desired sonic waves.

The purpose of periodically turning off the sonic waves is to give the fluid mixture 30 a chance to relax for a spell. For some types of fluid mixtures, this increases the amount of material separated. The "on" time for transducers 18 (the length of time sonic waves are emitted into the fluid mixture 30) should be on the order of two (2) seconds to ten (10) seconds, the exact value depending on the density of the fluid mixture being processed. A typical value for this "on" time is five (5) seconds. For a frequency of 20,000 Hertz, 100,000 sound wave cycles will be produced for such a five second interval. The duty cycle for the pulsed sonic waves (the ratio of the "on" time to the sum of "on" plus "off" time) will normally be in the range of 80% to 20%, the selected value depending on the density of the fluid mixture being processed. These "on" time and duty cycle parameters are established by adjustment of the appropriate controls in the adjustable pulser 62.

As indicated in FIG. 5, the electrical circuits for operating the second set of transducers 21 may be of the same construction as those used for operating the first set of transducers 18. Thus, a variable frequency generator 65 generates an electrical wave signal which is supplied by way of an amplifier 66 to the input of the transducer mechanism 21. An adjustable pulser 67 can be connected by way of a switch 68 to a control terminal in the amplifier 66. The initial frequencies, amplifier gains, "on" times and duty cycles for the two transducer mechanisms 18 and 21 may be, but need not be, the same. Typically, the initial frequencies for the transducer mechanisms 18 and 21 will be set about ten to twenty Hertz apart from one another.

Operation Of The Illustrated Embodiment

Considering now the operation of the sonic separator apparatus 10, the fluid mixture to be processed is supplied in a continuous manner to the channel structure 11 by the fluid supply pipe 27 and the inlet header box 24. This fluid mixture, designated by reference numeral 30, flows from left to right through the channel structure 11 and exits by way of the outlet header box 28 and its discharge pipe 29. As it moves through the channel structure 11, the fluid mixture 30 is subjected to two distinct sonic wave fields. One of these wave fields is a cavitation wave field comprised of sonic cavitation waves produced in the fluid mixture 30 by the leftmost transducer mechanism 18.

These cavitation waves travel upward in a vertical direction through the fluid mixture 30 from the channel structure material which is in contact with the core pieces 19 of the transducer mechanism 18. This direction of travel for the cavitation waves is perpendicular to the direction of flow of the fluid mixture 30. These cavitation waves travel upward until they meet the interface formed by the upper surface of the fluid mixture 30 and the air above it. For maximum production of cavitation waves, the vertical distance from the inner surface of the channel structure material which is in contact with the core pieces 19 to the interface between the fluid mixture and the air above it should be equal to one-third the wavelength of the cavitation waves.

As the fluid mixture 30 continues its journey through the channel structure 11, it soon encounters the second of the two sonic wave fields. This second wave field is a standing wave field comprised of sonic standing waves produced in the fluid mixture 30 by the second transducer mechanism 21 in cooperation with a downstream sonic wave reflector formed by the nearer side of the weir member 50. These standing waves travel in a horizontal direction through the fluid mixture 30 in a back-and-forth manner between the channel structure material which is in contact with the core pieces 22 of the transducer mechanism 21 and the nearer side of the weir member 50. This direction of travel for the standing waves is parallel to the direction of flow of the fluid mixture 30. As such, it is perpendicular to the direction of travel of the cavitation waves produced by transducer mechanism 18. In order to produce standing waves, the horizontal distance between the inner surface of the channel structure material which is in contact with the core pieces 22 and the nearer side of the weir member 50 should be equal to a multiple of one-half of the wavelength of the standing wave.

As the fluid mixture 30 passes though the cavitation wave field, the fluid goes through an oxidation and reduction process and becomes uniform or homogeneous in nature, somewhat similar to a uniform suspension. Once this homogeneous or uniformly suspended fluid flows beyond the influence of the cavitation wave field, it is exposed to the standing wave field between the riser portion 17 and the weir member 50. When irradiated by a standing wave field, agglomeration occurs at the nodes or antinodes of the standing wave. If the particles are denser than the fluid, they will sink after irradiation ceases. With an emulsion, a layer of the lighter liquid will form on the surface. In emulsions, the radiation pressure or steady component of the wave will often drive the coagulated particles to the surface.

The foregoing process is irreversible. The components of the treated fluid mixture do not recombine. Thus, as indicated in FIG. 3, the treated mixture leaving the channel structure 11 may be discharged into a settling tank 70 and the heavier components will settle to the bottom and the lighter components will rise to the top.

In the foregoing example, the first transducer mechanism 18 produced cavitation waves and the second transducer mechanism 21 produced standing waves. It should be noted, however, that this need not always be the case. For some types of mixtures, both of transducer mechanisms 18 and 21 may be operated to produce standing waves. For other types of mixtures, both of transducer mechanisms 18 and 21 may be operated to produce cavitation waves.

Considering now the positioning of the weir members 32 and 50, it is noted that such positioning will be dependent on the type of fluid mixture being processed and on its rate of flow through the channel structure 11. At the beginning of a processing run, the flow of the fluid mixture should be started and the fluid levels in the channel structure should be checked. The vertical position of the leftmost weir member 32 should be adjusted to provide a fluid level above the transducer mechanism 18 which corresponds as near as possible to the desired one-third wavelength value if cavitation waves are to be produced. The horizontal position of the rightmost weir member 50 should be adjusted to provide the desired half wavelength multiple for the riser 17 to weir 50 spacing. The vertical position of the weir member 50 should be set to provide sufficient fluid depth to cover the active area for the transducer mechanism 21.

The following listing is a partial list of possible applications for the sonic separator apparatus 10:

(a) Separating a contaminant from oil;
(b) Separating water from oil;
(c) Separating a contaminant from water;
(d) Separating impurities from coal; and
(e) Separating contaminants from sand.

For application (d), the fluid mixture is a slurry of impure coal particles mixed with an appropriate liquid. For application (e), the fluid mixture is a slurry of contaminated sand mixed with an appropriate liquid.

While there have been described what are at present considered to be preferred embodiments of this invention, it will be obvious to those skilled in the art that various changes and modifications may be made therein without departing from the invention and it is, therefore, intended to cover all such changes and modifications as come within the true spirit and scope of the invention.

What is claimed is:

1. In a method for separating a first material from a second material in a fluid mixture, the steps of:

flowing a fluid mixture through a first sonic wave field in which the sonic waves travel in a direction perpendicular to the direction of flow of the fluid mixture;

and flowing the fluid mixture through a second sonic wave field in which the sonic waves travel in a direction parallel to the direction of flow of the fluid mixture;

the sonic waves in these first and second sonic wave fields acting to break any bonding between a substantial portion of a first material and a second material in the fluid mixture.

2. A method in accordance with claim 1 wherein the sonic waves in one of the first and second sonic wave fields are cavitation waves and the sonic waves in the other of the first and second sonic wave fields are standing waves.

3. A method in accordance with claim 1 wherein the sonic waves in the first sonic wave field are cavitation waves and the sonic waves in the second sonic wave field are standing waves.

4. A method in accordance with claim 1 wherein the sonic waves in both of the first and second sonic wave fields are standing waves.

5. A method in accordance with claim 1 wherein the sonic waves in both of the first and second sonic wave fields are cavitation waves.

6. A method in accordance with claim 1 wherein the method is used for separating a contaminant from oil, the fluid mixture includes contaminated oil and the sonic waves in the first and second sonic wave fields act to irreversibly break any bonding between a substantial portion of the contaminant and the oil.

7. A method in accordance with claim 1 wherein the method is used for separating water from oil, the fluid mixture includes a mixture of water and oil and the sonic waves in the first and second sonic wave fields act to irreversibly break any bonding between a substantial portion of the water and the oil.

8. A method in accordance with claim 1 wherein the method is used for separating a contaminant from water, the fluid mixture includes contaminated water and the sonic waves in the first and second sonic wave fields act to irreversibly break any bonding between a substantial portion of the contaminate and the water.

9. A method in accordance with claim 1 wherein the method is used for separating impurities from coal, the fluid mixture is comprised of a liquid and coal with impurity slurry and the sonic waves in the first and second sonic wave fields act to irreversibly break any bonding between a substantial portion of the impurities and the coal.

10. A method in accordance with claim 1 wherein the method is used for separating contaminants from sand, the fluid mixture is comprised of a liquid and contaminated sand slurry and the sonic waves in the first and second sonic wave fields act to irreversibly break any bonding between a substantial portion of the contaminants and the sand.

11. A method in accordance with any one of claims 1 through 10, inclusive, wherein the sonic waves are produced in a continuous manner.

12. A method in accordance with any one of claims 1 through 10, inclusive, wherein the sonic waves in one of the sonic wave fields are produced in a pulsed manner by repetitively turning such waves on and off.

13. A method in accordance with any one of claims 1 through 10, inclusive, wherein the sonic waves in both the first and the second sonic wave fields are produced in a pulsed manner by repetitively turning such waves on and off.

14. Sonic separator apparatus for use in separating a first material from a second material in a fluid mixture, such apparatus comprising:

a channel structure providing a flow channel for a fluid mixture;

a first sonic transducer mechanism coupled to the channel structure for producing in the fluid mixture first sonic waves which travel in a direction perpendicular to the direction of flow of the fluid mixture;

and a second sonic transducer mechanism coupled to the channel structure for producing in the fluid mixture second sonic waves which travel in a direction parallel to the direction of flow of the fluid mixture;

these first and second sonic waves acting to break any bonding between a substantial portion of a first material and a second material in the fluid mixture.

15. Apparatus in accordance with claim 14 wherein the sonic transducer mechanisms are comprised of magnetostrictive transducers.

16. Apparatus in accordance with claim 14 wherein the sonic transducer mechanisms are comprised of piezoelectric transducers.

17. Apparatus in accordance with claim 14 and further including:

a sound velocity sensor for sensing the velocity of sound waves in the fluid mixture and producing an output signal indicative of such velocity;

and a variable frequency electrical wave generator for energizing one of the sonic transducer mechanisms and responsive to the output signal of the sound velocity sensor for adjusting the frequency of the generated electrical wave for minimizing any change in wavelength in the fluid mixture of the sonic waves produced by the sonic transducer mechanism which this generator energizes.

18. Apparatus in accordance with claim 14 and further including:

a sound velocity sensor for sensing the velocity of sound waves in the fluid mixture and producing an output signal indicative of such velocity;

a first variable frequency electrical wave generator for energizing the first sonic transducer mechanism and responsive to the output signal of the sound velocity sensor for adjusting the frequency of the generated electrical wave for minimizing any change in wavelength in the fluid mixture of the sonic waves produced by the first sonic transducer mechanism;

and a second variable frequency electrical wave generator for energizing the second sonic transducer mechanism and responsive to the output signal of the sound velocity sensor for adjusting the frequency of the generated electrical wave for minimizing any change in wavelength in the fluid mixture of the sonic waves produced by the second sonic transducer mechanism.

19. Apparatus in accordance with claim 14 and further including:

an electrical wave generator for supplying energizing waves to one of the first and second sonic transducer mechanisms;

and a pulser mechanism for repetitively enabling and disabling the supplying of the energizing waves to the one sonic transducer mechanism for causing the sonic wave produced by such mechanism to be produced in a pulsed manner.

20. Apparatus in accordance with claim 19 wherein:

the electrical wave generator produces energizing waves in the frequency range of 15 kilohertz to 40 kilohertz;

and the enabling intervals provided by the pulser mechanism are in the range of two seconds to ten seconds.

21. Apparatus in accordance with claim 14 and further including:

a first electrical wave generator for supplying energizing waves to the first sonic transducer mechanism;

a first pulser mechanism for repetitively enabling and disabling the supplying of the energizing waves to the first sonic transducer mechanism for causing the first sonic waves to be produced in a pulsed manner;

a second electrical wave generator for supplying energizing waves to the second sonic transducer mechanism;

and a second pulser mechanism for repetitively enabling and disabling the supplying of the energizing waves to the second sonic transducer mechanism for causing the second sonic waves to be produced in a pulsed manner.

22. Apparatus in accordance with claim 21 wherein:

the first and second electrical wave generators produce energizing waves in the frequency range of 15 kilohertz to 40 kilohertz;

and the enabling intervals provided by the first and second pulser mechanisms are in the range of two seconds to ten seconds.

23. Sonic separator apparatus for use in separating a first material from a second material in a fluid mixture, such apparatus comprising:

a channel structure providing a flow channel for a fluid mixture, such channel structure having an inlet end and an outlet end, and the bottom of the channel structure having a step construction with the outlet end portion being at a lower elevation than the inlet end portion, such end portions being connected to one another by a vertical riser portion;

a first sonic transducer mechanism coupled to the bottom of the inlet end portion of the channel structure for producing in the fluid mixture in the inlet end portion of the channel structure sonic waves which travels in a direction perpendicular to the direction of flow of the fluid mixture;

and a second sonic transducer mechanism coupled to the riser portion of the bottom of the channel structure for producing in the fluid mixture in the outlet end portion of the channel structure sonic waves which travels in a direction parallel to the direction of flow of the fluid mixture.

24. Sonic separator apparatus in accordance with claim 23 wherein the sonic waves produced by the first sonic transducer mechanism are cavitation waves and the sonic waves produced by the second sonic transducer mechanism is a standing wave.

25. Sonic separator apparatus in accordance with claim 23 and further including:

a first transverse weir member located in the inlet end portion of the channel structure downstream of the first sonic transducer mechanism , the vertical position of this first weir member being adjustable to adjust the depth of the fluid mixture seen by the first sonic transducer mechanism;

and a second transverse weir member located in the outlet end portion of the channel structure downstream of the second sonic transducer mechanism, the vertical position of this second weir member being adjustable to adjust the depth of the fluid mixture seen by the second sonic transducer mechanism, this second weir member also serving as a sound wave reflector for the sonic waves produced by the second sonic transducer mechanism for enabling such sonic waves to become standing waves.

* * * * *